(12) United States Patent
Ahmed

(10) Patent No.: US 7,948,189 B2
(45) Date of Patent: May 24, 2011

(54) APPLICATION OF MICROSYSTEMS FOR LIGHTING CONTROL

(75) Inventor: Osman Ahmed, Hawthorn Woods, IL (US)

(73) Assignee: Siemens Industry, Inc., Alpharaetta, GA (US)

(*) Notice: Subject to any disclaimer, the term of this patent is extended or adjusted under 35 U.S.C. 154(b) by 200 days.

(21) Appl. No.: 11/757,753

(22) Filed: Jun. 4, 2007

(65) Prior Publication Data

US 2008/0074059 A1 Mar. 27, 2008

Related U.S. Application Data

(60) Provisional application No. 60/847,199, filed on Sep. 26, 2006.

(51) Int. Cl.
*H05B 41/36* (2006.01)

(52) U.S. Cl. ........................ 315/291; 700/275

(58) Field of Classification Search .............. 700/14, 700/16, 17, 19, 28, 275, 276; 315/149, 156, 315/158, 159, 291, 312

See application file for complete search history.

(56) References Cited

U.S. PATENT DOCUMENTS

| | | | | |
|---|---|---|---|---|
| 6,100,538 A * | 8/2000 | Ogawa | ..................... | 250/559.29 |
| 6,246,321 B1 * | 6/2001 | Rechsteiner et al. | ......... | 340/522 |
| 6,307,331 B1 * | 10/2001 | Bonasia et al. | ............... | 315/312 |
| 6,583,573 B2 * | 6/2003 | Bierman | ....................... | 315/149 |
| 6,756,998 B1 * | 6/2004 | Bilger | ........................... | 715/764 |
| 6,792,319 B1 * | 9/2004 | Bilger | ............................. | 700/13 |
| 6,909,921 B1 * | 6/2005 | Bilger | ............................. | 700/19 |
| 6,912,429 B1 * | 6/2005 | Bilger | ............................. | 700/19 |
| 6,965,813 B2 * | 11/2005 | Granqvist et al. | ............ | 700/276 |
| 6,967,565 B2 * | 11/2005 | Lingemann | ............. | 340/310.11 |
| 6,990,394 B2 * | 1/2006 | Pasternak | ...................... | 700/275 |
| 7,190,126 B1 * | 3/2007 | Paton | ............................ | 315/308 |
| 7,298,871 B2 * | 11/2007 | Lee et al. | ...................... | 382/115 |
| 7,353,071 B2 * | 4/2008 | Blackwell et al. | .............. | 700/23 |
| 7,359,564 B2 * | 4/2008 | Keam et al. | ..................... | 382/254 |
| 2002/0047646 A1 * | 4/2002 | Lys et al. | ...................... | 315/312 |
| 2005/0252984 A1 * | 11/2005 | Ahmed | ............................ | 236/51 |
| 2006/0076908 A1 * | 4/2006 | Morgan et al. | ................ | 315/312 |

* cited by examiner

*Primary Examiner* — Charles R Kasenge

(57) ABSTRACT

An arrangement includes a plurality of microsystems and a controller. Each of the plurality of wireless microsystems is operable to measure at least one parameter of a space, and to transmit the at least one parameter wirelessly. The controller is operably coupled to receive the information corresponding to the at least one parameter directly or indirectly. The controller is operable to cause a change in a lighting control level based at least in part on the information. The wireless microsystems may suitably measure light levels and/or occupancy regarding the space.

20 Claims, 8 Drawing Sheets

US 7,948,189 B2

APPLICATION OF MICROSYSTEMS FOR LIGHTING CONTROL

This application claims the benefit of U.S. Provisional Patent Application Ser. No. 60/847,199, filed Sep. 26, 2006, which is incorporated herein by reference.

FIELD OF THE INVENTION

The present invention relates to indoor lighting control.

BACKGROUND

Buildings in which people work and live have systems that monitor and sustain the comfort level of the building environment. Such systems include heating, ventilation and air conditioning (HVAC) systems, lighting systems, as well as others. HVAC and lighting systems have existed, at least at some level, for thousands of years.

HVAC systems have over time become sophisticated, resulting in systems that are able to maintain careful balances of humidity and temperature, as well as provide adequate fresh air within buildings. Suitable temperature, humidity and oxygen levels contribute to the indoor environmental quality of a building or work place. Good environmental quality can translate to better productivity and health of the occupants.

One often overlooked element of environmental control is lighting control. Lighting systems in their basic form consist of light fixtures that provide a predetermined and constant output. The light fixtures may typically be turned on or off as need using manual switches. Such rudimentary manual control can result in tremendous inefficiency because it relies on unpredictable human control to ensure that the lighting is turned off when humans are not present. As a result, lights are typically left energized for substantial amounts of time that humans are not present.

To address these inefficiencies, some systems incorporate occupancy sensors that can automatically turn off the lights in the absence of human occupants. The occupancy sensors also automatically turn lights back on when human occupants are again detected.

While the current methods of lighting control using occupancy sensing improves energy efficiency of lighting systems in facilities, there is nevertheless a need for improved efficiency.

SUMMARY OF THE INVENTION

The present invention addresses the above described needs, as well as others, by employing wireless microelectromechanical systems ("MEMS"), referred to as wireless microsystems, that may be produced in bulk, and which measure various conditions in a room and, and communicate information representative of the measured information, preferably wirelessly, to data processing equipment. The processing equipment then controls the output of lighting devices based on the received information, as well as other information.

A first embodiment of the invention is an arrangement that includes a plurality of wireless microsystems, each microsystem operable to measure at least a first parameter of a space. In some examples, this first parameter may be a light level, or a detection of occupancy within the space. Each microsystem is preferably operable to communicate the measurement information to a control device. The control device is operable to control an output of a lighting device in the room based on the information.

One embodiment of the invention employs adjustable output lighting devices, such as dimming fluorescent light ballasts, to effectuate various control schemes enabled by the microsystem sensors. Examples of control schemes include detecting occupancy and dimming the lights if no occupancy is detected. Another control scheme involves detecting natural light (i.e. daylight) and controlling lights based at least in part on detected levels of natural light. Another scheme involves adjusting the lights to a prescribed level using light sensing feedback.

The lighting control arrangements described above provide enhanced efficiency by tailoring lighting output based on sensed values.

In other embodiments, some or all of the microsystems need not be wireless. However, there is an advantage to the use of wireless microsystems because it reduces labor and material costs associated with running wires.

The above described features and advantages, as well as others, will become more readily apparent to those of ordinary skill in the art by reference to the following detailed description and accompanying drawings.

DETAILED DESCRIPTION

Figure 1:
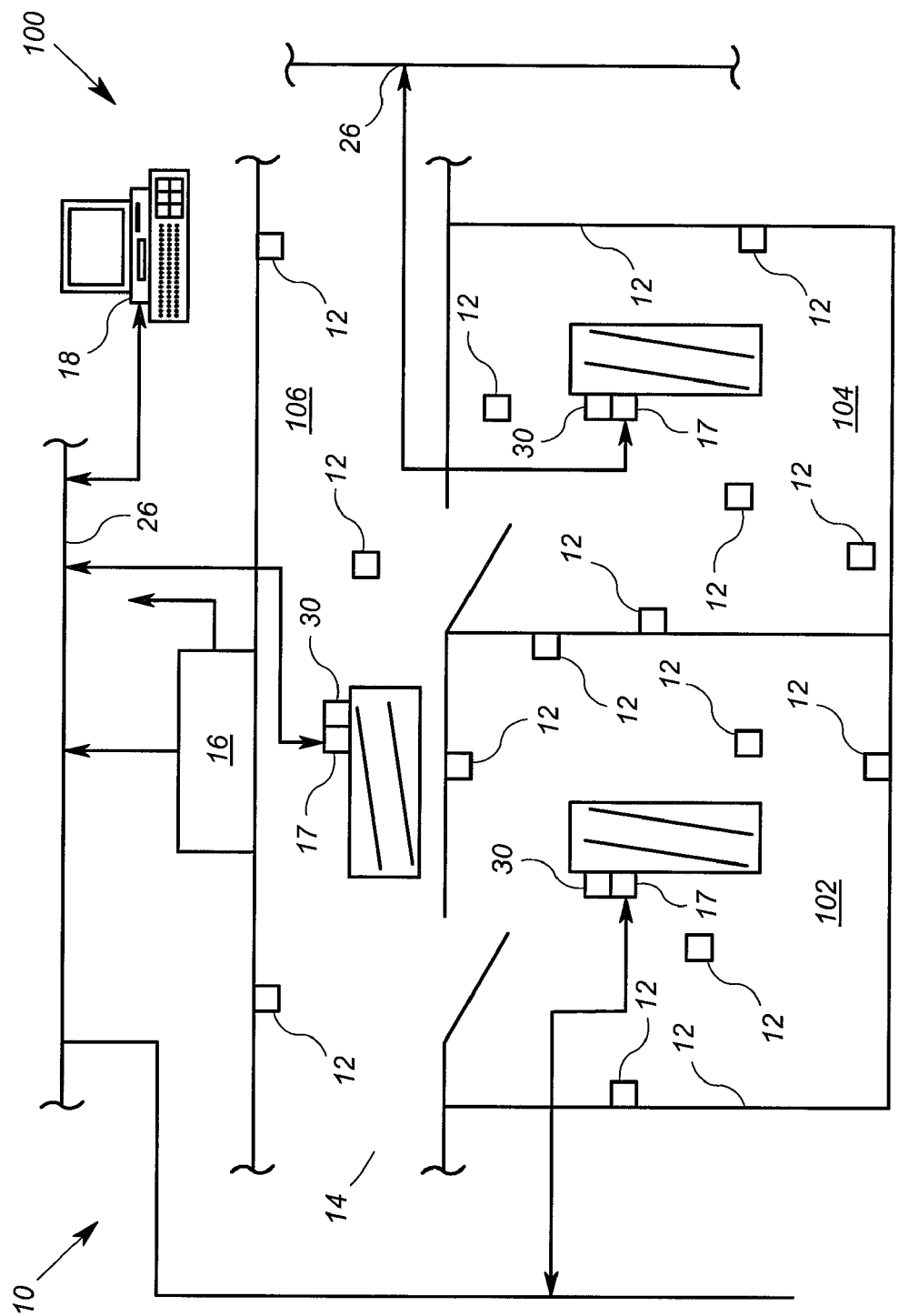
FIG. 1 shows a schematic block diagram of an exemplary embodiment of an arrangement according to the invention.

FIG. 1 shows a portion of a building 100 having multiple spaces in the form of two rooms 102 and 104 and a hallway 106. The portion of the building 100 incorporates an arrangement 10 for controlling light levels in accordance with an embodiment of the invention. It will be appreciated that the embodiment of the invention shown in FIG. 1 may readily be adapted to an infinite amount a building configurations.

The arrangement 10 that includes a plurality of wireless microsystems 12, a network device 16, a plurality of controllers 17, a plurality of light fixtures 30, a building network 26 and a central processing device 18.

In general, each microsystem 12 is operable to measure at least a first parameter in a building environment 14 and is further operable to communicate the first parameter wirelessly to another device in the arrangement 10, such as the network device 16 or one or more of the controllers 17. In some embodiments, the network device 16 is configured to communicate the parameter information from the plurality of microsystems 12 to room controllers 17 via the building network 26. In other embodiments, the microsystems 12 can communicate wireless directly to the controllers 17, as discussed above.

The room controllers 17 are devices that are configured to generate control signals that cause light fixtures 30 to increase or decrease light output in order to adjust the artificial light in the various spaces 102, 104, 106 of the building environment 100.

In a preferred embodiment, the microsystems 12 include sensors that can obtain information regarding the measured light levels and occupancy and/or movement. Further detail regarding an exemplary microsystem 12 is provided below in connection with FIG. 2.

The controllers 17 are devices, for example, any commercially available PID controller, PI controller, or other controller that is configured to control the output of the light fixtures 30 based on measured light level and occupancy. If the room appears to be occupied, as detected by the sensors 12, then the measured light level may be maintained at a level consistent with a healthy work environment. ASHRAE has studies and/or guidelines regarding a healthy lighting level of a workplace. Other available studies and/or guidelines may also be used to determine a desired light level. If the measured light levels indicate that the lighting is below a desired light level, then the controller 17 increases the light output of the light fixture 30. If the measured light level indicates that the lighting is above a desired light level, then the controller 17 reduces the lighting output of the light fixture 30 in order to conserve energy. Moreover, if the microsystem 12 instead indicates no occupancy in the room, the controller 17 may cause the output of the light fixture 30 to be reduced to a standby level or turned off completely.

Figure 3:
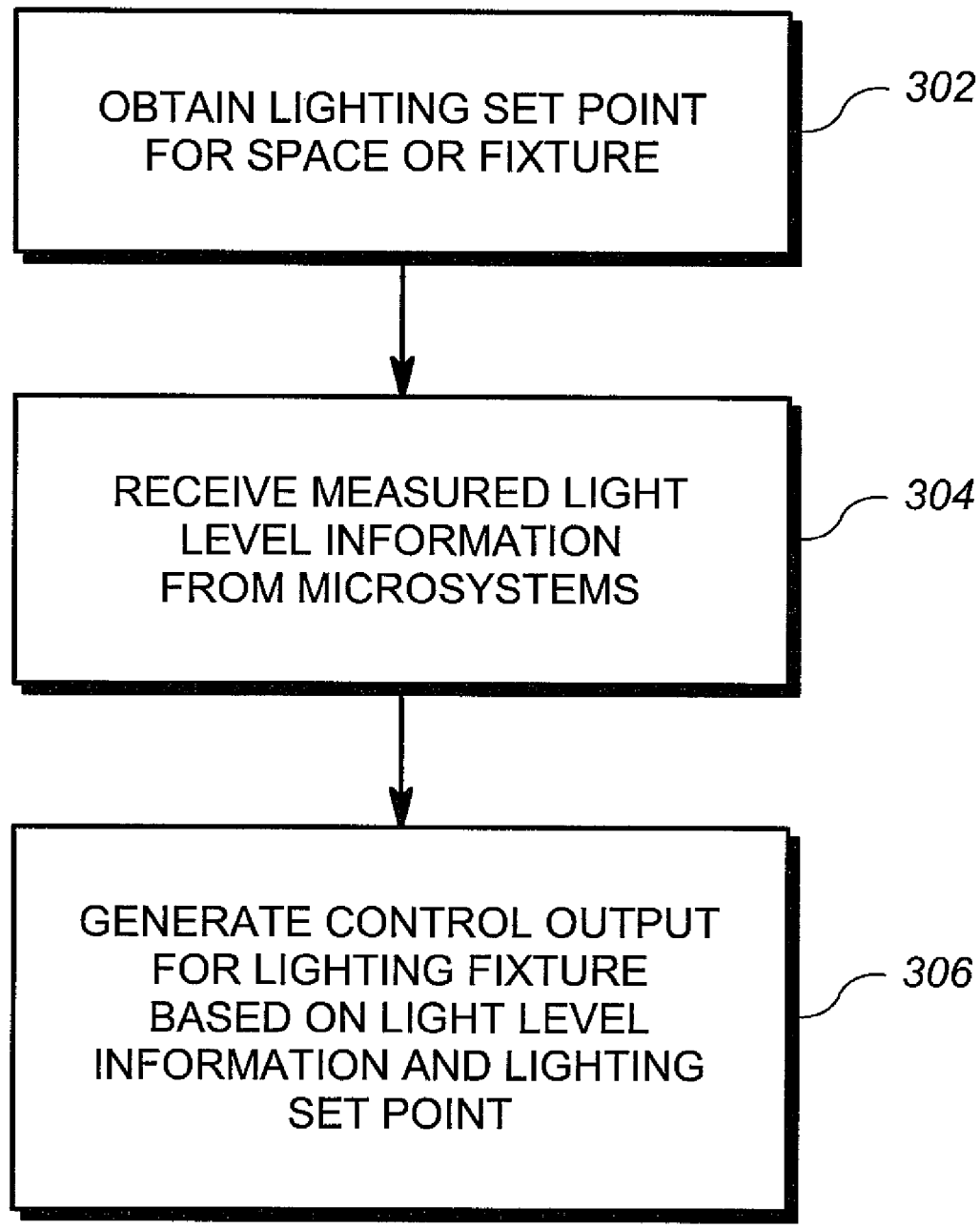
FIG. 3 shows a flow diagram of the operations of a controller of the arrangement of FIG. 1.

In one embodiment described below in connection with FIG. 3, the room controllers 17 are configured to control the lighting level based on occupancy using two operations. The first operation determines the light level set point, or desired light level. The light level set point is based at least in part on occupancy information, i.e. whether people are in the space. The occupancy information may be generated by the microsystems 12, or by conventional occupancy sensors. The second operation controls the light fixtures 30 based on the determined light level set point. In some embodiments, the light level set point may be received from another device, such as the central data processor 18, which is described further below.

In the embodiment described herein, the microsystems 12 include sensors that can differentiate natural sunlight from artificial light. The controller 17 is configured to use this information to further adjust the overall lighting level, as discussed below in connection with FIG. 7. However, other embodiments, such as the one discussed below in connection with FIG. 6, may be implemented with sensor microsystems that only provide a single light measurement.

Each controller 17 is further configured to communicate with other building nodes or devices via a building network 26. As will be discussed below, the building network 26 may be a wired network, a wireless network, or a combination of both. By way of example, the room controllers 17 may suitably be configured to communicate the light and occupancy information pertaining to one or more spaces 102, 104 or 106 to the central data processor 18.

To perform the foregoing operations, each of the controllers 17 includes a processing circuit, memory, and a communication circuit, not shown. As discussed above, commercially available controllers may suitably be used, as well as the wireless controller devices described in U.S. patent application Ser. No. 10/353,142 entitled "Building System with Reduced Wiring Requirements and Apparatus for Use Therein", filed Jan. 28, 2003, and U.S. patent application Ser. No. 10/672,527, filed Sep. 26, 2003, entitled "Building Control System Using Integrated MEMS Device", both of which are incorporated herein by reference. The controller 17 may suitably have a similar architecture as the sensor module of FIG. 2 except that the sensors 32, 34 would not be necessary, and would be replaced by circuit capable of generated suitable analog or digital control output signals for use by the lighting fixture 30.

In the embodiment describe herein, the central data processor 18 is a computer workstation that is connected to the building control system network 26. By way of example, the central data processor 18 may suitably be a control station of the building control or automation system, such as an INSIGHT™ Workstation available from Siemens Building Technologies, Inc. of Buffalo Grove Ill., and which is used in the APOGEE™ brand automation systems. Such control stations have the general capability of performing supervisory control, monitoring and data processing of sensor values and other aspects of distributed control systems. Such control stations may readily be modified to carry out the functions of the central data processor 18 discussed herein.

In any event, the central data processor 18 is configured to receive lighting level measurement information from the microsystems 12, either directly via the network device 16 and the building network 26, or indirectly from the controllers 17. The central data processor 18 is able to generate information regarding the lighting requirements for the building 14 for display, data recording, or for other control operations.

For example, the central data processor 18 may coordinate the received lighting and/or occupancy information from microsystems 12 of a plurality of rooms to execute more sophisticated control modes. To carry out the more sophisticated control modes, the central data processor 18 may recalculate or adjust set points for the lighting level for each of the controllers 17, and communicate the adjusted set points to the controllers 17 via the building network 26.

In another operation, the central data processor 18 may use lighting levels to determine problem areas, or areas that have inefficient lighting. To this end, in the embodiment shown in FIG. 1, it is noted that there are a plurality of microsystems 12 in the each space. The use of multiple microsystems 12 allows for granular data regarding light patterns within each space. The central data processor 18 can be configured to use these granular measurements to determine chronically dark areas within rooms or spaces. In such a case, the central data processor 18 can flag those areas that generate chronically low light levels so that technicians can investigate the problems areas. Such operations can increase the overall health and productivity of the workplace by detecting inadequate lighting conditions in a relatively timely manner.

The central data processor 18 also operates as a human interface to the arrangement 10, and allows for supervisory monitoring and control over the arrangement 10. The central data processor 18 may suitably perform the same functions for other building operations such as HVAC or fire safety operations.

Figure 2:
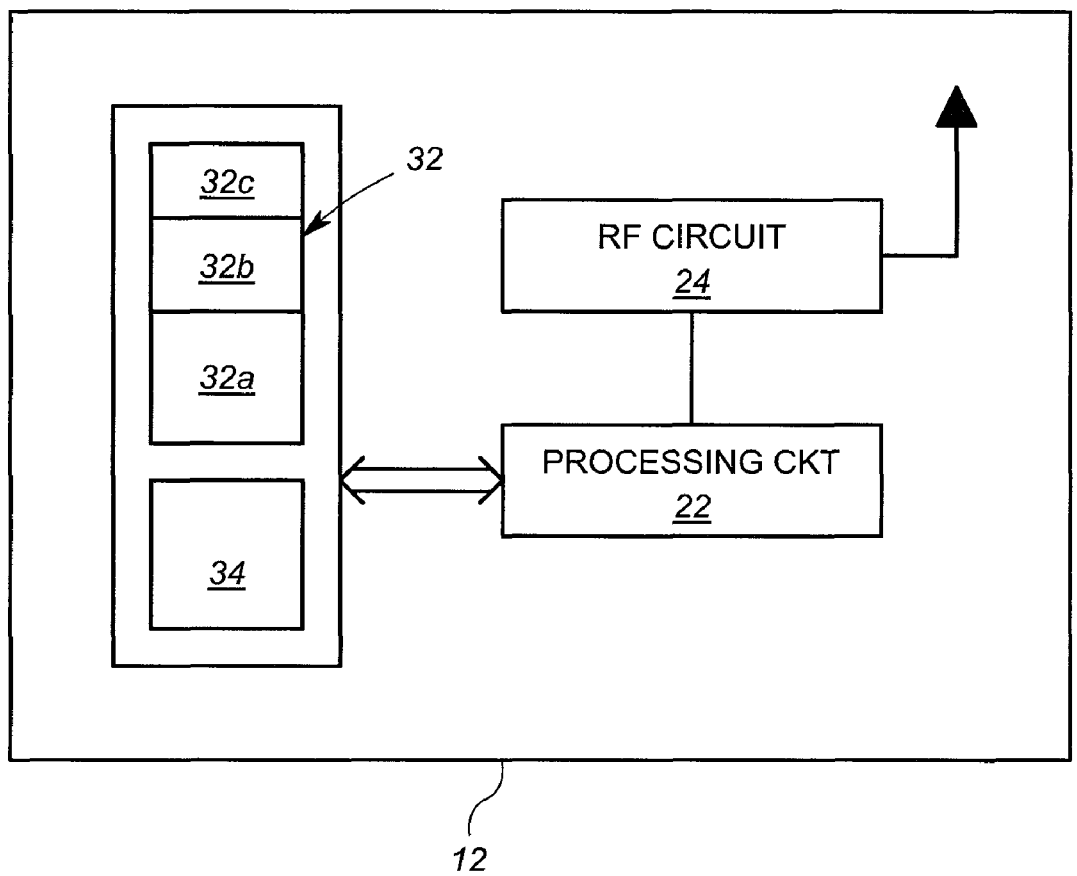
FIG. 2 shows a block diagram of an exemplary microsystem device that may be used in the arrangement of FIG. 1.

To carry out the above described operations, each of the microsystems 12 is operable to generate measurement information regarding light levels within their corresponding spaces, and are preferably configured to generate occupancy detection information. FIG. 2 shows an exemplary embodiment of one of the microsystems 12. However, it will be appreciate that several advantages of the invention may be carried out with other microsystem designs.

Referring to FIG. 2, the current state of the art of microsystems is sufficient to create a microsystem 12 operable to measure and/or monitor light levels and occupancy parameters. Each microsystem 12 may therefore employ a sensor suite 20 that includes a light level sensor unit 32 and an occupancy sensor 34. In the embodiment described herein, the light level sensor unit includes a first sensor 32a, a second sensor 32b, and a wavelength filter 32c. The first sensor 32a and the second sensor 32b may suitably have the same sensing technology. For example, the sensors 32a and 32b may suitably comprise conventional semiconductor optical detectors that translate incident optical energy to current.

The wavelength filter 32c is a device that is configured to filter the light reaching the second sensor 32b such that only a select wavelength band is provided to the second sensor 32b. In this embodiment the wavelength filter 32c is configured to block only the bands that correspond to artificial light, such as fluorescent lights. To this end, the wavelength filter 32c may suitably include a diffraction grating, such as a MEMS-based diffraction grating.

So constructed, the light level sensor unit 32 is operable to generate a measurement of all frequencies of visible light via the first sensor 32a, and a measurement of only those frequencies of visible light do not include artificial light via the second sensor 32b. The two values, total light value and blocked frequency light value, can be used to control the lighting in a space based on the relative levels of natural light and artificial light, as will be discussed further below in detail.

The occupancy sensor 34 may suitably be a MEMs-based radar motion detector. In such a case the MEMs-based occupancy sensor may require and RF (or radar) transmitter that may suitably be a MEMs device. Other embodiments may include a non-MEMs radar-based occupancy sensor. In such cases, an ordinary motion detector may be employed, or an RFID transmitter/receiver that is operable to detect "ID badges" outfitted with RFID tags.

The microsystem 12 also incorporates processing circuitry 22, as well as radio frequency transmission circuitry 24. General examples of MEMS devices having processing circuitry and RF capability are discussed in U.S. patent application Ser. No. 10/353,142 entitled "Building System with Reduced Wiring Requirements and Apparatus for Use Therein", filed Jan. 28, 2003, and U.S. patent application Ser. No. 10/672,527, filed Sep. 26, 2003, entitled "Building Control System Using Integrated MEMS Device", both of which are incorporated herein by reference. Other devices of this nature are known.

In one embodiment, the processing circuitry 22 is programmed or otherwise configured to generate light level measurements and an occupancy detection flag based on the measurements obtained by the MEMS sensor suite 20. The processing circuitry 22 is further operable to cause the RF circuit 24 to communicate that information wirelessly to the network device 16. In other embodiments, the processing circuitry 22 merely obtains the sensor values and provides those values (preferably with some low pass filtering) to the RF circuit 24 for transmission to the network device 16. The RF circuit 24 may suitably use Bluetooth or other short range RF transmission technology. The microsystem 12 may further include a battery, not shown, to power the operations, as well as power management circuitry, not shown, that may be used to charge the battery using absorbed and converted light energy.

In one embodiment, the processing circuitry 22 provides two separate light sensor values. These two separate light sensor values may include a natural light value and an artificial light value, or some other values from which such values may be derived. To this end, the two separate light sensor values from the sensors 32a and 32b include sufficient information to determine at least an estimate of natural light value and an artificial light value. By way of example, it is noted that the sensor 32a will detect broadband light $L_{BB}$ that includes both natural light and artificial light, while the sensor 32b detects light $L_{FI}$ in only the light frequencies outside of the band of artificial light, due to the filter 32c. The processing circuit 22 may suitably determine a natural light estimate and an artificial light estimate based on these values.

In particular, it is noted that the overall light value may be estimated as:

$$L_{BB}=L_{SL}+L_{AR},$$

where $L_{SL}$ is the contribution of sunlight and $L_{AR}$ is the contribution of artificial light. The value of $L_{SL}$ may be expressed as:

$$L_{SL}=L_{FI}+L_{CFI},$$

where $L_{CFI}$ is the value of natural sunlight within the frequency of the artificial light. More specifically, it is known that natural light and artificial light have frequencies that overlap. Because the contribution of natural sunlight that is within the artificial light frequency band is filtered out from the value $L_{FI}$ along with the artificial light, this filtered out portion $L_{CFI}$ must be added in to determine the overall sunlight strength.

The value of $L_{CFI}$ may be estimated as a function of $L_{FI}$. To this end, it may be determined theoretically, or experimentally, either for a general application or for a particularly implementation, what proportion A of the total natural sunlight $L_{SL}$ is expected to be found in the frequency band overlapping with artificial light. With this value A, the following is true:

$$(1-A)L_{SL}=L_{FI},$$

and thus:

$$L_{SL}=L_{FI}/(1-A).$$

Accordingly, the sunlight component $L_{SL}$ of the value $L_{BB}$ is determined. It can also be seen that the artificial light component $L_{AR}$ may be determined by $$L_{AR}=L_{BB}-L_{SL}$$

The processing circuit 22 may therefore determine at least estimates of the artificial light and natural light components of the measured light based on the measurements obtained from the sensors 32a and 32b. These values may be provided as an output. via the RF circuit 24, as discussed above.

Referring again to FIG. 1, the network device 16 may suitably be an RF transceiver connected to a building control system wired or wireless network 26, such that described in U.S. patent application Ser. No. 10/353,142, the disclosure of which is incorporated herein by reference. In some embodiments, the network device 16 is co-located with one or more the controllers 17 in a traditional field controller panel as is known in the art. However, in the disclosed embodiment, the controllers 17 are located proximate to the light fixtures 30 they control, and may be hardwired or wirelessly connected to the network device 16. The principles of this embodiment of the invention do not require either option over the other.

The dimming ballast light fixtures 30 are dimmable fluorescent lights that may be controlled, for example, using a 3-wire, 0-10V dc or 2-wire Lutron Dimming Ballast available from Lutron at www.lutron.com. The controllers 17 are operably coupled, through actuators within the fixtures 30 to adjust the amount of artificial light output from fluorescent bulbs. In the embodiment described herein, further microsystems 12 are provided at or near the fixtures 30 that can ensure proper operation of the fixtures 30. The controller 17 may therefore use the lighting and occupancy information from the room associated with a particular light fixture 30 and the occupancy-based lighting requirements to determine how much the fixtures 30 should increase or decrease lighting output to help bring the lighting to the appropriate level.

A typical operation of the arrangement 10 of FIG. 1 may be illustrated by reference to a flow diagram of operations of a room controller in one of the spaces, for example, in the room or space 102. FIG. 3 shows a flow diagram of the operations of the room controller 17 in the control of the lighting level in the space 102. The operations of FIG. 3 would be performed separately for each space 102, 104 and 106 by the controller 17 corresponding to the light fixture 30 of that space.

In step 302, the room controller 17 obtains a lighting set point for the space and/or the corresponding fixture 30. In at least some embodiments, the room controller 17 selects between a plurality of available set points based on occupancy information regarding the space 102 and time-of-day or time-date information. The available set points may be stored in a memory of the controller 17. In particular, the controller 17 may be programmed with the available set points during a commissioning operation, or may receive the available set points from the central data processor 18 from time to time.

In any event, the available lighting set points in this embodiment include a first lighting level to be used when the room is occupied, a second lighting level to be used when the room is briefly unoccupied and/or unoccupied during normal work or business hours, and a third lighting level to be used when the room is unoccupied for a lengthy time, and/or during off-business hours. It will be appreciated that various other factors may be taken into account to determine a lighting level set point.

Figure 5:
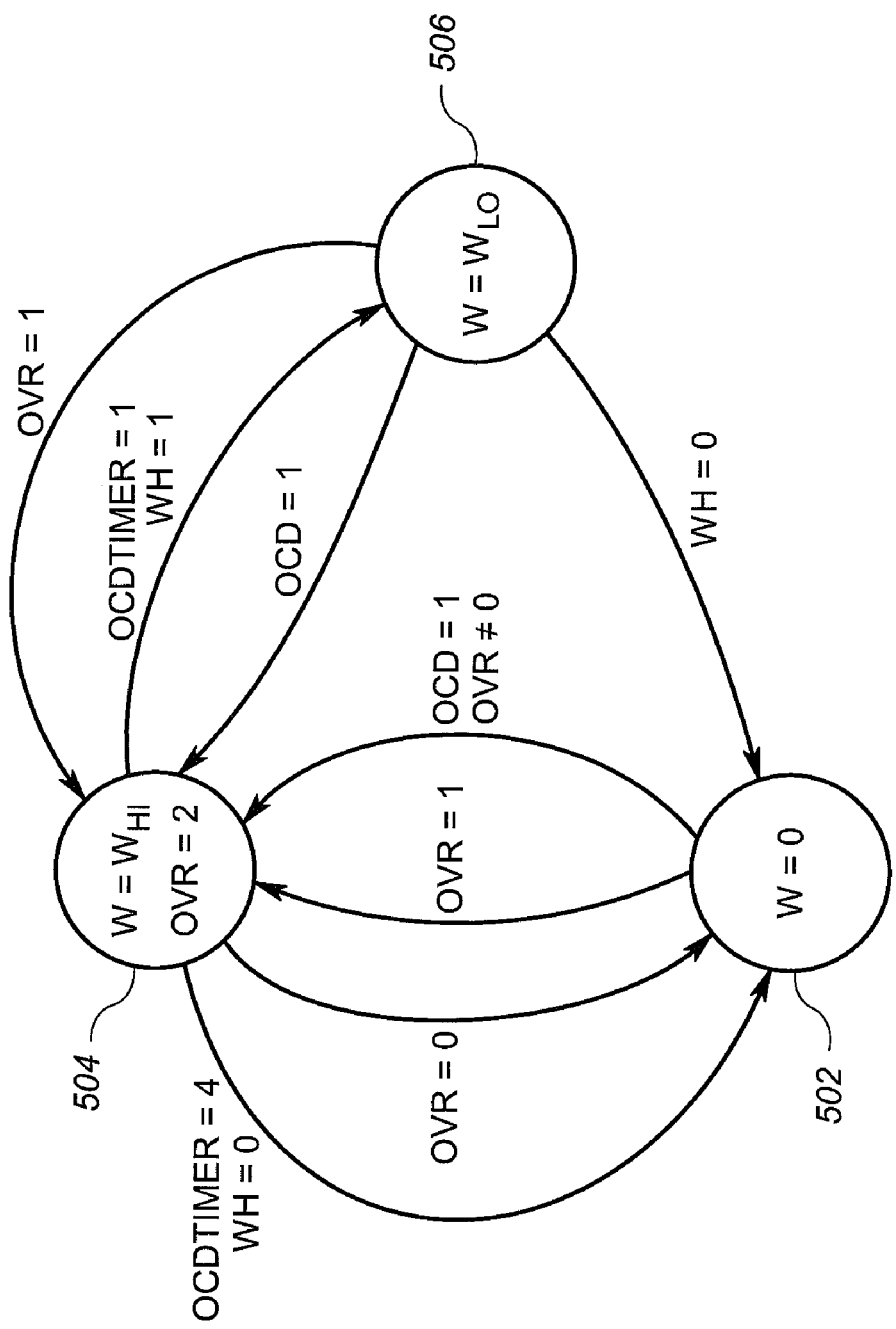
FIG. 5 shows a flow diagram of a second exemplary set of operations that may be used to determine a lighting set point for arrangements according to the invention

Accordingly, in one embodiment the controller 17 in step 302 determines which of the available set points to employ based on room occupancy information received from the microsystems 12, as well as from time-date information. FIG. 5, discussed further below, show an exemplary state diagram of a process that identifies which of the first, second and third lighting set point level is to be employed based on occupancy information and/or date-time information. The state diagram of FIG. 5 may be employed by the controller 17 in determining the appropriate lighting set point.

Figure 4:
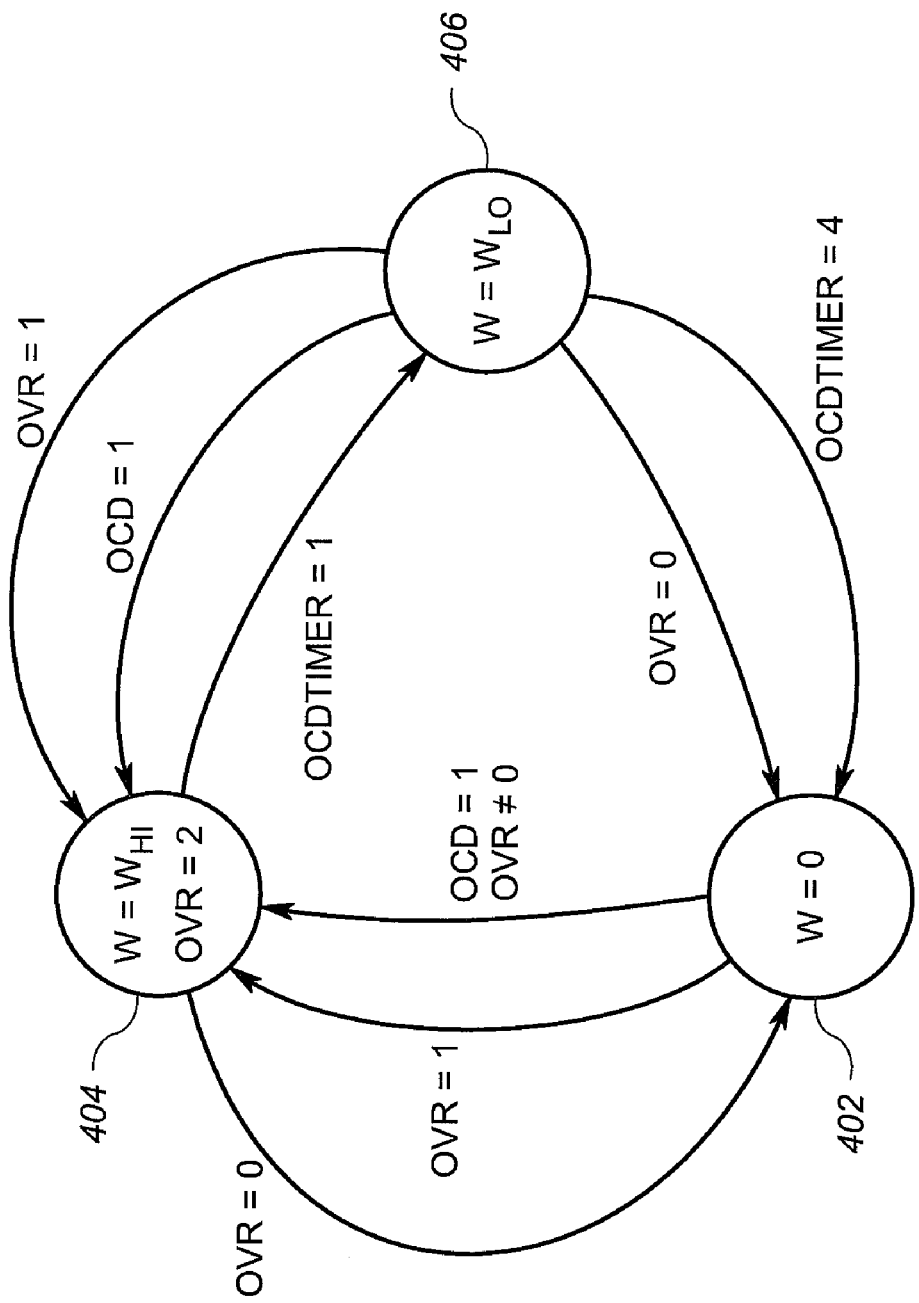
FIG. 4 shows a flow diagram of an first exemplary set of operations that may be used to determine a lighting set point for arrangements according to the invention

Alternative, in step 302, the controller 17 may implement the state diagram of FIG. 4, which shows an alternative process for selecting which of the first, second and third lighting set point is to be employed. In FIG. 4, which is discussed below in further detail, the selection of the set point is determined based on whether, and how long, the space 102 has been unoccupied.

Referring again to FIG. 3, in step 304, the controller 17 receives measured light level information from the microsystems 12 in the space or room corresponding to the controller 17. The light information in one embodiment comprises a general light level measurement that corresponds to a measure of lumens. Such a measurement may be provided by an optical sensor such as the sensor 32a of the microsystem 12 of FIG. 2.

One reason for using multiple microsystems 12 within the space 102 having a single light fixture 30 is to obtain a more reliable indicator of the actual light within the room. In particular, the controller 17 may obtain a plurality of light measurements and then perform a statistical operation to determine an overall lighting level within the room 102. The statistical operation may consist primarily of obtaining a mean or median of the measurements from each microsystem 12. The multiple microsystems 12 also provides redundancy in the event that one of the microsystems becomes covered by an object, obscured by dirt or dust, or otherwise becomes inoperative.

In step 306, the controller 17 performs a control operation based on the set point selected in step 302 and the microsystem light measurements received in step 304. To this end, the controller 17 may use PID control, PI control or some other control algorithm to generate a control output for the light fixture 30. As a general rule, if the light measurements from the microsystems 12 indicate that the lighting level is below the lighting set point (typically by more than a hysteresis-type threshold), then the controller 17 provides signals to the light fixture 30 that cause the light fixture to increase its output. Similarly, if the light measurements from the microsystems 12 indicate that the lighting level is above the lighting set point (again typically by more than a hysteresis-type threshold), then the controller 17 provides signals to the light fixture 30 that cause the light fixture to decrease its output.

Figure 6:
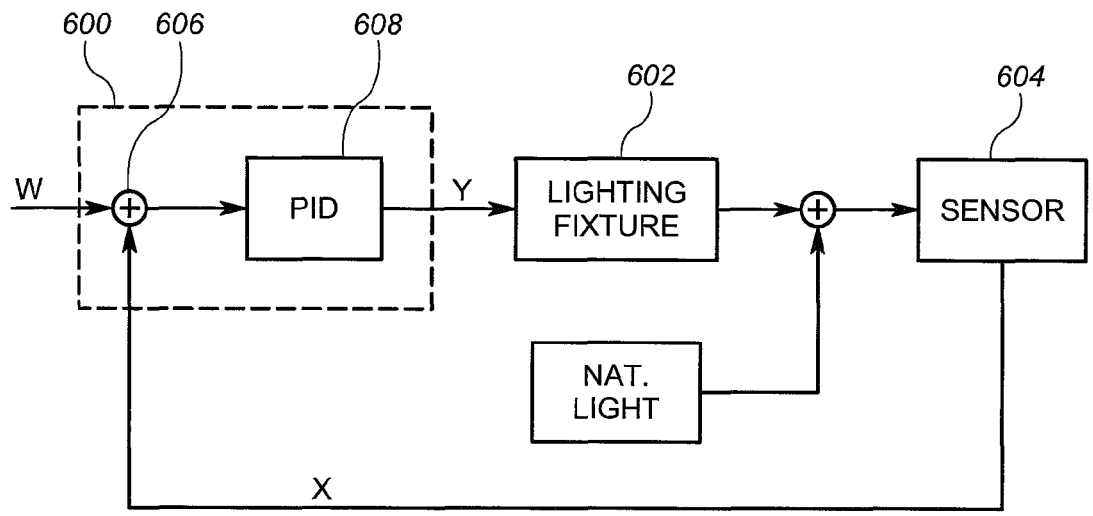
FIG. 6 shows a first exemplary lighting level control schematic in accordance with embodiments of the invention.
Figure 7:
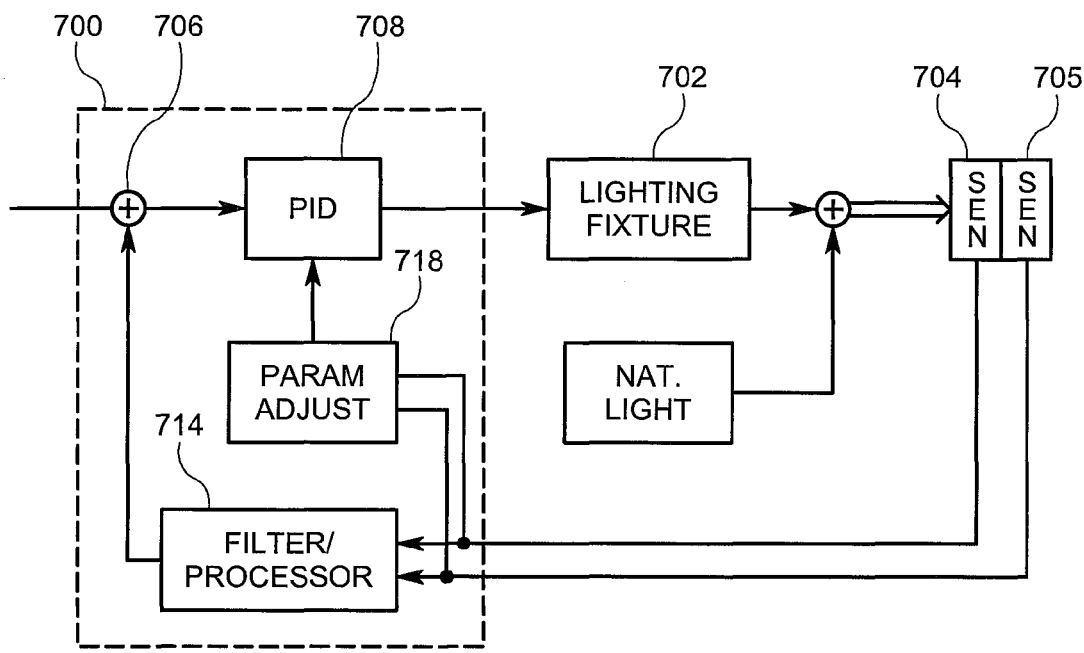
FIG. 7 shows a second exemplary lighting level control schematic in accordance with embodiments of the invention.

FIGS. 6 and 7, discussed further below, show exemplary control loop schematics that illustrate how the controller 17, the microsystems 12 and the light fixture 30 cooperate to control the light in a room or space. In FIG. 6, the control is based on the overall light level in the room, and thus would not require separate artificial light and sunlight information. In FIG. 7, control is based in part on the type of light in the space, and takes advantage of the ability of the microsystem 12 of FIG. 2 to provide both natural light and artificial light content information.

Referring again to FIG. 3, the controller 17 effectively repeats steps 302-306 to perform ongoing control of the lighting level. However, the controller 17 typically only repeats step 302 when it is appropriate to change the set point. By way of example, a controller FIGS. 4 and 5 indicate changes in a lighting control set point that would trigger an execution of step 302 by the controller 17. A set point may also change in accordance with a scheduling program executed by the controller 17. Moreover, a change in set point may also be effected by a command message received by the central data processor 18, or by a manual override command from a light switch, not shown, within the space 102.

As discussed above, the operations of FIG. 3 are carried out by the controllers 17 of each of the other spaces 104, 106 (see FIG. 1) in a similar manner, based on light level measurements of microsystems 12 within the respective space 104, 106. It will also be appreciated that a single open space may employ multiple controllers 17 for multiple light fixtures 30. In such a case, each controller 17 generates the control output based on light level measurements from microsystems 12 located in proximity to the controller 17, and which would detect light generated primarily by the light fixture 30 controlled by the controller 17.

Referring now to FIG. 4, a state diagram 400 illustrates the operations of a processing device used to determine the lighting set point for a room, space, or individual lighting bank based on date-time information and occupancy information. The operations of FIG. 4 may be carried out by any suitable processing device that can communicate with a lighting controller. For example, in the example of FIG. 1, the operations of FIG. 1 may be carried out by the controller 17, a processor within the network device 16, the central data processor 18, or even a processor within one the of the microsystems 12. The determined set point is then used by a lighting controller such as the controller to control lighting in the associated space.

In general, three states 402, 404, 406 of FIG. 4 represent the three set point levels that are available for the space. The state 402 represents a point in which the set point w for the room is equal to a lowest level, for example, "off". This value may suitably be represented as a lighting level (in any suitable units) equivalent to zero. Accordingly, in this embodiment, the state 402 corresponds to w=0.

The state 404 represents a point in which the set point w is equal to level that corresponds to an occupied room, or w=$w_{hi}$. The value $w_{hi}$ represents a lighting level that corresponds to an acceptable work environment for occupants. For example, the value $w_{hi}$ level could correspond to an ASHRAE standard for workplace lighting.

The state 406 represents a point in which the set point w is equal to level that is below that of an occupied room, but somewhat about the "off" level. The set point may be set to a value $w_{lo}$ which corresponds to a low, background amount of light. The low level (but non-zero) amount of light may be desirable in work spaces in which it is not always desirable to have lights completely "off" in an unoccupied location, particularly if a room or space is only temporarily unoccupied. In the example described herein, a room goes to the low level w=$w_{lo}$ of lighting after being unoccupied for a short time, and then goes to the lowest level w=0 if the room continues to be unoccupied for a longer period of time.

In state 402, with the lighting set point at w=0, two actions can cause a change of state. First, if an override signal is set to turn the lights "on", or OVR=1, then the state transitions from 402 to 404, and the new set point is w=$w_{hi}$. An override signal may be a light switch, or a signal from a remote processor. The light switch device typically trumps automated control. Second, if occupancy is detected by an occupancy detector, or OCD=1, and the override signal is not set to turn lights "off" or OVR=0, then the state similarly transitions from 402 to 404, and the new set point is w=$w_{hi}$. Thus, if motion is detected in a dark room, the set point w changes such that the lighting controller causes the lights to turn on.

Once in state 404, the override signal is automatically set to "2", which is neither override "on" nor override "off". Until a new override signal is received, the value of OVR remains at "2", which allows for automated control to take place.

In state 404, there are also two conditions that cause a change in state. First, if an override signal is received to turn the lights "off", or OVR=0, then the state transitions from 404 to 402, and the new set point is w=0. Second, if a first predetermined amount of time has elapsed since occupancy has been detected in the room, represented by a time value OCDTIMER=1, then the state transitions from 404 to 406. In other words, if no evidence of occupancy is detected with a predetermined amount of time, such as, for example, 15 minutes, an hour or some other select time, then the lights go to the lower "standby" mode where the set point is w=$w_{lo}$. In the embodiment described herein, the OCDTIMER value increments if the predetermined amount of time passes without evidence of occupancy.

Referring back to FIG. 1, the OCDTIMER value may be determined in the following manner. As discussed above, one or more of the microsystems 12 (or another occupancy detection device) is configured to set a flag is motion is detected. The microsystem 12 then communicates that flag to the processor that performs the set point operations of FIG. 4, for example, the controller 17. The microsystem 12 then resets the flag=1 and a timer is started. The timer is configured to expire at a predetermined time. If the microsystem 12 detects occupancy at any time before expiration of the time, then the timer is reset. If the timer finally expires (because it was not reset), then the flag is set to zero indicating a lack of occupancy for the predetermined time.

While each microsystem 12 thus generates an occupancy flag value, the controller 17 (or other processor that is used to determine the set point) periodically queries the microsystem 12 to determine the status of the flag. For example, assuming the controller 17 is in the state 404, the controller 17 would query the microsystem 12 after each interval of a predetermined time period. The predetermined time period will depend on the needs of the particular implementation, and will generally be anywhere from a few minutes to one or more hours. If the answer to the query reveals that the flag has been reset, then the OCDTIMER is set to one. If the answer to query by the controller 17 reveals that the flag at the microsystem 12 is still set, then the OCDTIMER value remains at zero.

Referring again to FIG. 4, if OCDTIMER=0, then there is no state transition from state 404. However, if OCDTIMER=1, then there is a state transition from state 404 to state 406.

In state 406, where the light set point is at the low standby level, w=$w_{lo}$, there are multiple events that can cause a state transition. If the override signal is set to "on", or OVR=1, then the state transitions from 406 to 404. If the override signal is set to "off", or OVR=0, then the state transitions from 406 to 402. If occupancy is detected in the room while in state 406, or OCD=1, then the state transitions to state 404 such that the lights will turn on full again. If the lack of occupancy continues for multiple predetermined time periods, e.g. OCDTIMER=4, then the state transitions from 404 to 402. Thus, if the light set point is in the standby mode for a relatively long time, (e.g. four times the amount of time required to transition into standby mode), the light set point goes to the completely "off" mode, or w=0.

It will be appreciated that after each state transition of FIG. 4, the controller 17 obtains the set point of the new "state" and uses that set point w in the control of the lighting operation. FIGS. 6 and 7, discussed below, provide examples of how such set points are used in lighting control.

FIG. 5 shows another example of a state diagram illustrating the determination of set points. In FIG. 5, the three states 502, 504, 506 are similar to the respective states 402, 404, 46 of FIG. 4, and represent the same three set point levels that are available for the space. However, the state transitions of FIG. 5 include additional features that depend on whether the current date-time reflects normal work hours or off-work hours. In particular, in FIG. 5, the flag or variable WH is set (1) when the current date and time is within the a predetermined set of "working hours", and is reset (0) when the current date and time is outside the predetermine set of working hours. For example, the value WH=1 may represent times and dates that fall within the hours of 0700 and 1900 during weekdays, and WH=0 at all other times.

In state 502, with the lighting set point at w=0, two actions can cause a change of state. First, if an override signal is set to turn the lights "on", or OVR=1, then the state transitions from 502 to 504, and the new set point is w=$w_{hi}$. As discussed above, an override signal from, for example, a light switch device, typically trumps automated control. Second, if occupancy is detected by an occupancy detector, or OCD=1, and OVR is not equal to 0, then the state similarly transitions from 502 to 504, and the new set point is w=$w_{hi}$. Thus, if motion is detected in a dark room, the set point w changes such that the lighting controller causes the lights to turn on, so long as the lights have not been forced off by an override signal, i.e. OVR=0.

As with state 404 of FIG. 1, the override signal is always reset to neutral, or in other words OVR=2, when state 404 is transitioned into. The override signal remains at OVR=2 until a new override value is received.

In state 504, there are also three conditions that cause a change in state. First, if an override signal is set to turn the lights "off", or OVR=0, then the state transitions from 504 to 502, and the new set point is w=0. Second, if a first predetermined amount of time has elapsed since occupancy has been detected in the room, represented by a time value OCD-TIMER=1, and the value WH=0, then the state transitions from 504 to 502. In other words, if no motion is detected for a short period of time during off-hours, then the lighting set point will be set to zero. Finally, if the first predetermined amount of time has elapsed since occupancy has been detected in the room, represented by a time value OCD-TIMER=1, and the value WH=1, then the state transitions from 504 to 506. In other words, if no evidence of occupancy is detected with a predetermined amount of time during normal working hours, then the lights go to the lower "standby" mode where the set point is $w=w_{lo}$.

In state 506, where the light set point is at the low standby level, $w=w_{lo}$, there are multiple events that can cause a state transition. If the override signal is set to "on", or OVR=1, then the state transitions from 506 to 504. If the override signal is set to "off", or OVR=0, then the state transitions from 506 to 502. If occupancy is detected in the room while in state 406, or OCD=1, then the state transitions to 504 so that the lights will turn on full again. If the value of WH transitions to zero, then the state transitions from 404 to 402. Thus, if the light set point is in the standby mode and the time transitions into an off-hour time, then, the light set point goes to the completely "off" mode, or w=0.

As with FIG. 4, after each state transition, the controller 17 obtains the set point of the new "state" and uses that set point w in the control of the lighting operation. It will be appreciated that other variations of lighting set point determination operation may be employed. However, at least some embodiments of the invention provide the benefit of controlling light based on room occupancy (e.g., as in FIGS. 4 and 5) and/or date-time information (e.g., as in FIG. 5)

As mentioned above, the lighting set points generated in the manner discussed above are employed by controllers to cause light fixtures to produce light output at a select desired level.

To this end, FIG. 6 shows a first example of a control system that controls the level of light in a space, such as the room 102 of FIG. 1. However, it will be appreciated that the control system of FIG. 6 may control a single light fixture or a bank of light fixture in a larger open space or semi-open space.

The control system of FIG. 6 includes a controller 600, a light fixture 602, and at least one microsystem light sensor 604. The controller 600 may suitably be the controller 17 of FIG. 1, or any other configurable process control device known in the art. In general, the controller 600 generates a controlled output y based on a set point value w and a measured light value x. In the example described herein, the controller 600 includes a summation device 606 and a PID control unit 608. The light fixture 602 is a variable output light fixture such as the light fixture 30 of FIG. 1. The light fixture 602 is operable to adjust its light output based on a variable voltage input. For example, the light fixture 602 may include dimmable fluorescent lights and the corresponding 0-10V dc Lutron Dimming Ballast, discussed further above. The microsystem sensor 604 is a device that is operable to measure a light level within the room or space near the light fixture, such as the microsystem sensor 32a of the microsystem 12 of FIG. 2.

In operation, the summation device 606 receives a light set point w. The lighting set point w may be received from a remote processing device, or generated by circuitry associated with the controller 600 itself. As discussed further above, the lighting set point may suitably be generated in accordance with the operations described above in connection with FIG. 4 or 5.

The summation device 606 also receives a light measurement value x from the microsystem sensor(s) 604. Similar to the system discussed above in connection with FIG. 1, the light measurement value x received by the summation device 606 can be a composite value derived from a plurality of microsystem light sensors. The composite value x may be an average of sensor values of several microsystem light sensors or some other statistical value derived from a plurality of microsystem light sensors. In such a case, the controller 600 itself may receive values from a plurality of microsystem sensors and generate the composite value x. Alternatively, one of the microsystems may be configured to receive sensor values from the other microsystems and generate the composite value x therefrom.

In any event, the summation device 606 then generates an error signal e from the light sensor value x and the light set point w. As is generally known in the art, the summation device 606 generates the error signal e using the equation e=w−x or an equivalent equation. The summation device 606 provides the error signal e to the PID control unit 608. The PID control unit 608 performs a PID filter operation using a proportional process, an integrating process, and a derivative process, as is generally known in the art, in order to generate a control output y based on the input error signal e. The control output y represents a control signal for the light fixture 602.

The light fixture 602 receives the control signal y and adjusts, if necessary, the output of the light fixture 602 in accordance with the control signal y. Thus, the light fixture 602 provides a different level of output light (or conversely, dimming) in correspondence to the control signal y.

The microsystem sensors 604 thereafter generate an updated light measurement value x, which includes the effect of any recent change in the light output of the light fixture 602. The microsystem sensors 604 provide the updated light measurement value x to the summation device 606 and the process repeats as described above.

The above described operations adjust the lighting output y in response to overall light measurements. Such measurements may include natural light or sunlight in addition to the output from the light fixture 602, as shown in FIG. 6. However, no attempt is made to distinguish between natural light sources (e.g. sunlight) and artificial light. In some cases, it is not advantageous to treat all light sources identically.

For example, control strategies may be varied based on the relative amounts of artificial and natural light. Control strategies may vary due to the fact that large amounts of natural light will limit the effectiveness of adjusting the artificial light output, and little or no natural light will greatly increase the effectiveness of the artificial light output. Such factors may be require different gain and/or time constant values in the controller. In another example, it may be determined that more (or less) natural light is required for worker effectiveness than artificial light. Thus, an overall value of light $L_{BB}$ that is primarily constituted of sunlight may not be sufficient for worker wellbeing while the same overall value of light $L_{BB}$ may be sufficient if it is primarily constituted of artificial light. Of course, the exact opposite may be determined.

For these reasons as well as others, it can be useful to perform lighting control using information regarding natural light content and artificial light content in a space.

To address this issue, FIG. 7 shows an alternative control system in which both the light level and the source or nature of the light is considered in the control of the overall lighting level of a space. Similar to the system of FIG. 6, the control system of FIG. 7 controls the level of light in a space, such as the room 102 of FIG. 1.

The control system of FIG. 7 includes a controller 700, a light fixture 702, at least one first microsystem light sensor 704, and at least one second microsystem light sensor 705. The controller 700 may suitably be the controller 17 of FIG. 1, or any other configurable process control device known in the art. In general, the controller 700 generates a controlled output y based on a set point value w and a first measured light value x1 and a second measured light value x2. In the example described herein, the controller 700 includes a summation device 706, a filtering/processing unit 714, a parameter adjustment block 718, and a PID control unit 708. It will be appreciated that some or all of the elements of the controller 700 may suitably be implemented as a programmed processor.

The light fixture 702 is a variable output light fixture such as the light fixture 30 of FIG. 1 or the light fixture 602 of FIG. 6.

The first microsystem sensor 704 is a device that is operable to generate a measurement of a first aspect of light within the room or space near the light fixture. For example, the first aspect may be the amount of overall visible light, the amount of artificial light, or the amount of natural light. As illustrated in the example of FIG. 2, described above, the wavelength profile of artificial light and natural light is readily distinguishable such that an optical sensor and a light filtering device devices can be configured to generate a measure of only artificial light, only natural light, as well as a combination of both. In the example described herein, it will be presumed that the first aspect of light is the amount of artificial light in the space, or the amount of light in the wavelengths corresponding to artificial light in the space. To this end, the first microsystem sensor 704 may suitably generate a measurement of light that only falls within the wavelengths corresponding to artificial light. This value is the first measurement value x1. Similar to the system discussed above in connection with FIG. 1, the first measurement value x1 can be a composite value derived from a plurality of microsystem light sensors.

Thus, with reference to the microsystem 12 of FIG. 2, the first microsystem sensor 704 may suitably be the light sensor 32b, which only measures light within the wavelength band passed by the filter 32c. In the embodiment of FIG. 2, the processing circuit 22 determines an estimate of the artificial light $L_{AR}$ based on both sensors 32a and 32b which may be used as the value x1.

Similar to the sensor 704, the second microsystem sensor 705 is a device that is operable to generate a measurement of a second aspect of light within the room or space near the light fixture. In this example, the first microsystem sensor 704 may suitably generate a measurement of all visible light and/or a set of wavelengths that includes all visible light. This value is the second measurement value x2. Similar to the system discussed above in connection with FIG. 1, the light measurement value x2 can be a composite value derived from a plurality of microsystem light sensors.

Thus, with reference to the microsystem 12 of FIG. 2, the first microsystem sensor 704 may suitably be the light sensor 32a, which measures light within a much larger band than does the combination of the light sensor 32b and filter 32c. Thus, in some embodiments, the value x1 is equal to $L_{AR}$ described above in connection with FIG. 2, and the value x2 is equal to $L_{SL}$.

The filtering/processing unit 714 is operably configured to receive one or both of the light measurement values x1 and x2 and generate a processed light value xp therefrom. For example, the filtering/processing unit 714 may generate a light measurement value that consists of the light value in the artificial light wavelength band, plus a scaled or adjusted light value for light outside the artificial light wavelength band. The adjustment of the light value in non-artificial light wavelengths compensates for the fact that natural light is perceived differently by humans. The filtering/processing unit 714 may readily determine such a processed light value xp using the first value x1 and the second measurement value x2. By way of example, the processed light value may suitably be $$xp = A(x1) + B(x2),$$

where A and B are constant scalar values (or even functions). In a typical case, the values of A and B are 1 or less. The selection of values of A and B will depend on the amount that each type of light is to be weighted. The values of A and B may be determined experimentally, or based on available studies of the effects of purely artificial light (in total lumens) verses the effects of purely natural light (in total lumens). In some circumstances, it may be advantageous to weight sunlight more, as it may require more artificial light to provide the same level of well-being as natural sunlight. In other circumstances, it may be advantageous to weight sunlight less, as there may be wavelengths of sunlight that contribute to the overall light measurement, but are not optimal for performing work duties.

The filtering/processing unit 714 is configured to provide the processed light value xp to the summation device 706.

Like the filtering/processing unit 714, the parameter adjustment block 718 is also configured to receive the light values x1 and x2. The parameter adjustment block 718 is configured to adjust the gain and/or time constant values used by the PID control unit 708 in operation. In particular, the control system of FIG. 7 (as well as FIG. 6) has a somewhat unusual aspect in that the process value (the amount of measured light) can affected strongly by an uncontrollable variable, sunlight. As a result, the effect of a change in artificial light can differ based on whether sunlight is present. The parameter adjustment block 718 thus optionally adjusts the gain and/or time constant values used by the PID control unit 708 based on the relative presence of sunlight or natural light and artificial light. Whether to perform such an adjustment and/or the details of adjustment will depend on the implementation details of the particular system.

In operation, the first summation device 706 receives a light set point w. As discussed further above, the lighting set point w may be determined by a processing device in the manner described above in connection with FIG. 4 or 5.

The summation device 706 also receives the processed light value xp from the filter processing unit 714.

The summation device 706 then generates an error signal e from the processed light value xp and the light set point w. As is generally known in the art, the summation device 706 generates the error signal e using the equation e=w−xp or an equivalent equation. The summation device 706 provides the error signal e to the PID control unit 708. The PID control unit 708 performs a PID filter operation using a proportional process, an integrating process, and a derivative process, as is generally known in the art, in order to generate a control output y based on the input error signal e. The control output y represents a control signal for the light fixture 702.

One or more of the operational parameters of the PID control unit 708 may adjusted via adjustment signals received from the parameter adjustment block 718. The parameter adjustment block 718 determines an adjustment based on the light values x1 and x2.

The light fixture 702 receives the control signal y and adjusts, if necessary, the output of the light fixture 702 in accordance with the control signal y. Thus, the light fixture 702 provides a different level of output light (or conversely, dimming) in correspondence to the control signal y.

The microsystems 704 thereafter generate updated light measurement values x1, x2, which include the affect of any recent change in the light output of the light fixture 702 as well as changes in the amount of natural light. The microsystems 704 provide the updated light measurement values x1 and x2 to the filtering/processing unit 714, and the parameter adjustment block 718, and the process repeats as described above. It will be appreciated that the filtering/processing unit 714 in this embodiment constitutes a part of the controller 700, and shares hardware and circuitry therewith. However, in other embodiments, the filtering/processing unit 714 may be included in other devices.

The above described control scheme of FIG. 7 thus controls the amount of artificial light generated based, at least in part, on the amount of the total light in the room that is contributed by natural light. This is true whether or not the parameter adjustment block 718 is included. However, the parameter adjustment block 718 provides the opportunity to further optimize control.

In an alternative control scheme, the control algorithm itself may utilize feedback regarding the relative levels of artificial light and natural light.

One advantage of some embodiments of the invention is that the microsystems 12 may be employed extensively throughout the building at a reasonable cost, because of the ability to mass produce the devices. The use of MEMS devices and wireless microsystems results in lower power consumption. The use of such wireless devices drastically reduces the labor and costs associated with installation by eliminating wiring. In addition, the microsystems 12 are small and may be placed on walls, fixtures, the floor, and even on moveable objects.

The large amount of granular data regarding light levels has many advantages, including providing the ability to archive data to allow for trending of light patterns within building space over time. The ability to detect the levels of natural light and trend natural light patterns over time is also advantageous. To these ends, it will be appreciated that the microsystem sensors such as the microsystems 12 of FIG. 1 and microsystems 604 and 704 of FIGS. 6 and 7, respectively, also communicate their data from time to time to a central data repository, such as the central data processor 18 of FIG. 1.

Figure 8:
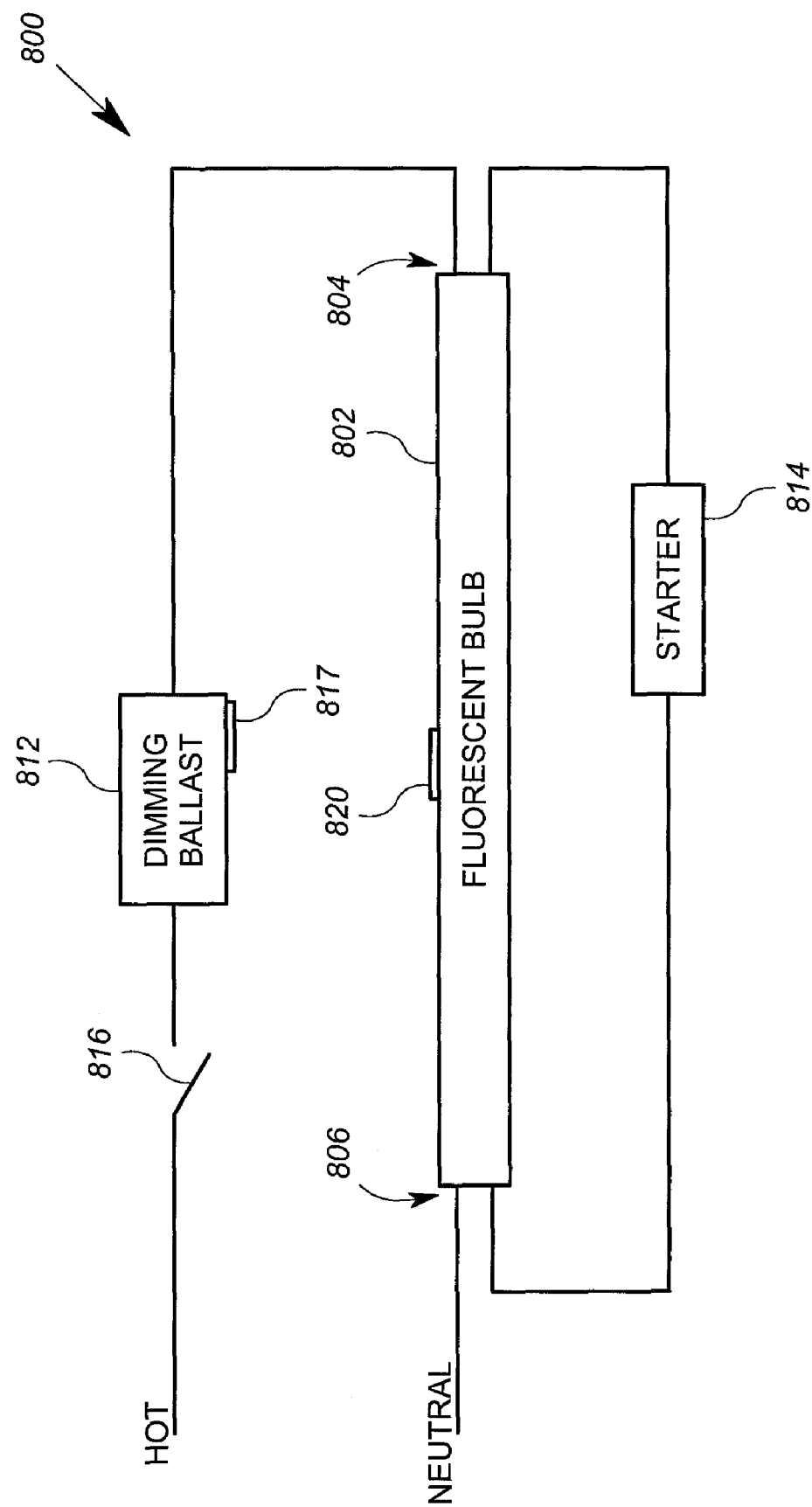
FIG. 8 shows an exemplary occupancy-controlled lighting device in accordance with an embodiment of the present invention.

FIG. 8 shows another embodiment of the present invention. FIG. 8 shows a schematic of a "smart" fluorescent lighting arrangement 800 that may be used to control lighting in a local area based on occupancy and/or the presence of external light. The lighting arrangement 800 includes fluorescent lamp or bulb 801, or similar type of light, configured to be connected to a ballast, and in particular, an adjustable dimming ballast 812, examples of which are discussed further above. The lamp 801 includes, in this embodiment, an outer bulb body 802, a first coupling end 804, a second coupling end 806 and a sensor module 820. The first coupling end 804 and second coupling end 806 are configured to mechanically couple to a standard fluorescent lamp fixture, shown only schematically herein, but which is known in the art. The coupling ends 804, 806 may take any form of connector suitably used by fluorescent lamps.

In the exemplary embodiment described herein, the first coupling end 804 includes a first terminal or pin coupled to the dimming ballast 812, and a second pin connected to a starter circuit or starter device 814. Similarly, the second coupling end 806 includes two pins. The first pin of the second coupling end 806 is coupled to the AC "neutral" line of the building electrical system, and the second pin of the second coupling end 806 is coupled to the starter device 814. The construction and operation of the starter device 814 is well known in the art and may take any suitable form. The dimming ballast 812 is connected to an AC "hot" line via a switch 816.

The fluorescent lamp fixture includes or supports the dimming ballast 812, the starter device 814, and the wiring between the coupling ends 804, 806, the dimming ballast 812 and the starter device 814. The dimming ballast 812 may also be supported elsewhere. The dimming ballast 812 may suitably be the same as the dimming ballast associated with the lighting fixture 30 described above in connection with FIG. 1.

The arrangement 800 further includes a controller 817 that is operably connected to the dimming ballast 812. The controller 817 is operable to generate control signals and provide them to the dimming ballast 812 to control the dim level of the light bulb 801.

The controller 817 may suitably be configured to control the output of the dimming ballast 812 based on detected room occupancy, and/or the amount of natural light, as discussed above in connection with FIGS. 4-7. To this end, the controller 817 includes wireless communication circuitry configured to receive detected room occupancy and/or light information from the sensor module 820. In general, the controller 817 may suitably have the same operation and function as the wireless controller 17 described above in connection with FIG. 1.

The wireless sensor module 820 is preferably securely fixed on the exterior of the fluorescent lamp body 802, such that the sensors thereon are in a position to sense occupancy/movement and/or light conditions in the space being served by the unit 800. The bulb body 802 otherwise may have any standard fluorescent bulb construction.

The sensor module 820, as discussed above, preferably includes an occupancy sensor, a wireless transmission device, and processing circuit. An example of the general architecture of a suitable sensor module is shown in FIG. 2 and discussed above. In other embodiments, the sensor module 820 may additionally (or alternatively) contain MEMS sensors that detect light similar to the particular embodiment described above in connection with FIG. 2. The sensor module 820 may suitably be affixed to the bulb body 802 by adhesive. The sensor module 820 is sufficiently small that it does not block a significant amount of light generated by the lamp 801.

It is further noted that the sensor module 820 may suitably include a circuit, not shown, which is capable of recharging its power source using light or optical power. The light sensor array of such a circuit would preferably be implemented on the side of the sensor module 820 that faces center of the bulb 801.

In operation, the control operations described above in connection with FIGS. 1-7, as well as others not listed, may be performed using the light bulb 801 with the built-in wireless microsystem module 820. The wireless module 820 communicates occupancy and/or light level information to a controller 817, which in turn controls the dimming ballast 812 to adjust the light level in the room or space accordingly.

It is noted that in an alternative embodiment, the microsystem module 820 could be included on a compact fluorescent bulb, not shown, but which is known in the art. A compact fluorescent bulb is a fluorescent bulb intended to fit in a normal incandescent light socket. In such an embodiment, the controller 817 may simply control an on/off switch, as opposed to a dimming ballast.

Another embodiment of occupancy-related lighting control in accordance with the invention is particularly suited for a large working areas using shared light sources. For example, it is known to employ several modular work stations (or cubicles) in a large open room. In such systems, is not uncommon for the lighting fixtures provide light to a combination of cubicles.

Figure 9:
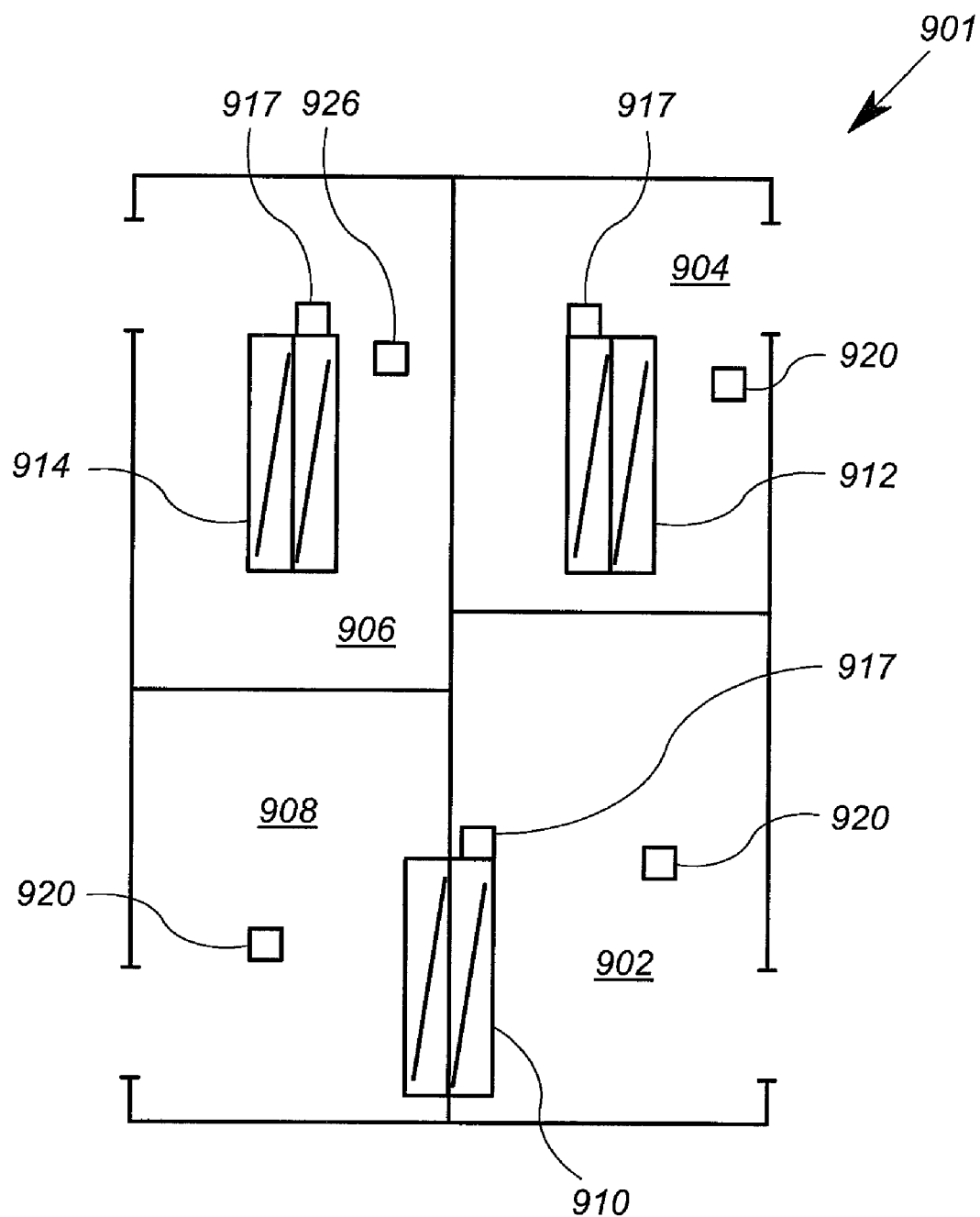
FIG. 9 shows an exemplary embodiment of a lighting control system for multiple work spaces having shared occupancy-controlled lighting devices.

Occupancy-based lighting control using shared light fixtures is discussed below in conjunction with FIG. 9. FIG. 9 shows a floor plan of an example of a room 901 having four work spaces 902, 904, 906 and 908. While the room 901 would typically include common areas and hallway areas, the room 901 of FIG. 9 is simplified for clarity of exposition. The principles of the arrangement of FIG. 9 may readily be extended to rooms having any number of work spaces, common areas and hallway areas. Common areas and hallway areas may be treated in a similar manner as the work spaces 902, 904 etc.

In FIG. 9, the work spaces 902, 904, 906 and 908 typically have lower modular walls, or no walls at all, as would be typical of so-called cubicles.

The floor plan of FIG. 9 shows three overhead light fixtures 910, 912 and 914. The fixture 910 is located such that it partly overhangs the space 902 and partly overhangs the space 908. In this example, it is assumed that the fixture 910 is positioned to provide a meaningful amount of light to the spaces 902 and 908, but not to spaces 904 and 906. The fixture 912 is located such that it overhangs the space 904, but with some proximity to the spaces 902 and 906. In this example, it is assumed that the fixture 912 is positioned to provide a meaningful amount of light to the spaces 902, 904 and 906, but not to space 908. The fixture 914 is located such that it overhangs the space 906, but with some proximity to the space 904. In this example, it is assumed that the fixture 914 is positioned to provide a meaningful amount of light to the spaces 904 and 906, but not to spaces 902 and 908.

Also included in FIG. 2 are a number of sensor modules 920 which may suitably be the same as the sensor modules 20, and controllers 917 similar to the controllers 17. The fixtures 910, 912 and 914 preferably include dimming ballasts similar to the fixtures 30 of FIG. 1.

As will be discussed below in detail, the control outputs of the lighting fixtures 910, 912 and 914 are a function of the need for light in the work spaces to which they provide light. Moreover, the need for light in the work spaces 902, 904, 906 and 908 is determined as a function of occupancy, and possibly as a function of the presence of natural light.

In the example described herein, it will be assumed that the controllers 917 are capable of producing a desired control output Y that corresponds to a set point W for its corresponding lighting fixture. For example, if the set point $W_{910}$ for the fixture 910 is x, then it is assumed that the controller 917 is configured to control the fixture 910 to generate a control output $Y_{910}$ that is equal to or nearly equal to x.

Accordingly, the description below shows how the set points for the various fixtures 910, 912 and 914 are generated based on occupancy of the individual spaces 902, 904, 906 and 908. The controllers 917 then are presumed to be able to generate outputs corresponding to the fixtures' set points.

As an initial matter, the need for artificial light in each room 902, 904, 906 and 908 is given by the set points $W_{902}$, $W_{904}$, $W_{906}$ and $W_{908}$, respectively. The artificial light set points are determined as a function of occupancy and natural light.

$$W_{902}=F(OCC_{902},NL_{902})$$

$$W_{904}=F(OCC_{904},NL_{904})$$

$$W_{906}=F(OCC_{906},NL_{906})$$

$$W_{908}=F(OCC_{908},NL_{908})$$

where $OCC_r$ is the occupancy of each space r, and $NL_r$ is the natural light for each space r.

These functions may be further reduced to:

$$W_{902}=F_1(OCC_{902})-NL_{902}$$

$$W_{904}=F_1(OCC_{904})-NL_{904}$$

$$W_{906}=F_1(OCC_{906})-NL_{906}$$

$$W_{908}=F_1(OCC_{908})-NL_{908}$$

wherein $F_1$ is an absolute light requirement (natural+artificial) for a space, based on occupancy. The absolute requirement function $F_1$ may be simply consist of a first light value for an occupied state and a second light value for an unoccupied state. The light requirement function may also have other values based on time of day, similar to the functions described above in connection with FIGS. 4 and 5. Thus, the function $F_1$ may be determined by either of the state diagrams shown in FIG. 4 or 5, as well as others.

The values $W_{902}$, $W_{904}$ etc. thus represent the need for artificial light from the lighting fixtures 910, 912 and 914. The natural light values $NL_r$ are subtracted from each rooms total "need" for light because the natural light is satisfying that portion of the total "need". The natural light values $NL_r$ can be provided by the sensor modules 920 in each space r. To this end, each of the sensor modules 920 can have the general structure of the module 20 of FIG. 2, which is configured to provide a measure of both total light and natural light.

The needs for artificial light for each space 902, 904, 906 and 908 are met by the combined contributions of the lighting fixtures 910, 912 and 914 that are in a position to provide light to those spaces. In the example herein, the satisfaction of the need for artificial light in the space 902 may be expressed as:

$$W_{902}=a_{902}*Y_{910}+b_{902}*Y_{912}+c_{902}*Y_{914}$$

where $Y_{910}$ is the total output of the fixture 910, $a_{910}$ is the proportion of the total light from the fixture 910 that reaches the space 902, $Y_{912}$ is the total output of the fixture 912, $b_{902}$ is the proportion of the total light from the fixture 912 that reaches the space 902, $Y_{914}$ is the total output of the fixture 914, and $c_{902}$ is the proportion of the total light from the fixture 914 that reaches the space 902.

In an analogous manner, the satisfaction of the need for artificial light in the spaces 904, 906 and 908 may be expressed as:

$$W_{904}=a_{904}*Y_{910}+b_{904}*Y_{912}+c_{904}*Y_{914}$$

$$W_{906}=a_{906}*Y_{910}+b_{906}*Y_{912}+c_{906}*Y_{914}$$

$$W_{908}=a_{908}*Y_{910}+b_{908}*Y_{912}+c_{908}*Y_{914}$$

where $a_r$ is the proportion of the total light from fixture 910 that illuminates the space r, the value $b_r$ is the proportion of the total light from fixture 912 that illuminates the space r, and the value $c_r$ is the proportion of the total light from fixture 914 that illuminates the space r.

As discussed above, not all fixtures 910, 912, and 914 in this example provide light to every work space 902, 904, 906 and 908. Given the constraints of the example described further above, the satisfaction of lighting needs for the spaces 902, 904, 906 and 908 may be reduced to the following:

$$W_{902} = a_{902} * Y_{910} + b_{902} * Y_{912} + 0$$

$$W_{904} = 0 + b_{904} * Y_{912} + c_{904} * Y_{914}$$

$$W_{906} = 0 + b_{906} * Y_{912} + c_{906} * Y_{914}$$

$$W_{908} = a_{908} * Y_{910} + 0 + 0$$

or $$W_{902} = a_{902} * Y_{910} + b_{902} * Y_{912}$$

$$W_{904} = b_{904} * Y_{912} + c_{904} * Y_{914}$$

$$W_{906} = b_{906} * Y_{912} + c_{906} * Y_{914}$$

$$W_{908} = a_{908} * Y_{910}$$

As can be seen above, there are typically multiple ways in which the lighting needs for the work spaces 902, 904, 906 and 908 may be met. In particular, the lighting needs for space 904 may be met by any feasible combination of light from lighting fixtures 912 and 914.

One of the goals of the shared fixture lighting control scheme discussed herein is to provide efficiency. To this end, the control scheme that is carried out (which may suitably be carried out by one or more of the controllers 917, or possibly by a central control station not shown) seeks to find the combination of set points for the fixtures $W_{910}$, $W_{912}$ and $W_{914}$ that results in satisfying the needs $W_{902}$, $W_{904}$, $W_{906}$ and $W_{908}$, while consuming the least electrical energy.

To this end, it was noted above that the lighting output $Y_f$ for a fixture f can be assumed to roughly equal the set point $W_f$ for the fixture f. Thus, the above listed equations for the needs of the spaces may be rewritten as:

$$W_{902} = a_{902} * W_{910} + b_{902} * W_{912}$$

$$W_{904} = b_{904} * W_{912} + c_{904} * W_{914}$$

$$W_{906} = b_{906} * W_{912} + c_{906} * W_{914}$$

$$W_{908} = a_{908} * W_{910}$$

In addition, it can be stated that the set point for any one light fixture 910, 912 and 914 is the maximum of its needed contribution for each room it illuminates. If space 902 only needs a little light from the fixture 910 and the space 908 needs a lot of light from the fixture 910, then the fixture 910 must produce the amount of light dictated by the needs of the space 908. Thus:

$$W_{910} = \text{Max}(\text{Need}_{910,902}, \text{Need}_{910,908})$$

$$W_{912} = \text{Max}(\text{Need}_{912,902}, \text{Need}_{912,904}, \text{Need}_{912,906})$$

$$W_{914} = \text{Max}(\text{Need}_{914,904}, \text{Need}_{914,906})$$

where $\text{Need}_{f,r}$ is equal to the need for a total light output from a fixture f to provide adequate light to space r. In general, each value of $\text{Need}_{f,r}$ is a potential set point for the fixture f. The maximum of those potential set points for a fixture f is adopted as the set point for the fixtures.

The value of $\text{Need}_{f,r}$ is, in turn, a function of the proportion of the total light $W_f$ produced by the fixture f that provides light to the space r and how much of the total light needs $W_r$ of space r are met by contributions from other light fixtures. Based on the foregoing, the following values of $\text{Need}_{f,r}$ are determined:

$$\text{Need}_{910,902} = (W_{902} - b_{902} * W_{912}) / a_{902}$$

$$\text{Need}_{910,908} = W_{908} / a_{908}$$

$$\text{Need}_{912,902} = (W_{902} - a_{902} * W_{910}) / b_{902}$$

$$\text{Need}_{912,904} = (W_{904} - c_{904} * W_{914}) / b_{904}$$

$$\text{Need}_{912,906} = (W_{906} - c_{906} * W_{914}) / b_{906}$$

$$\text{Need}_{914,904} = (W_{904} - b_{904} * W_{912}) / c_{902}$$

$$\text{Need}_{914,906} = (W_{906} - b_{906} * W_{912}) / c_{902}$$

With the various equations set above, a controller attempts to determine a set of values ($W_{910}$, $W_{912}$, $W_{914}$) that satisfy the constraints of ($W_{902}$, $W_{904}$, $W_{906}$ and $W_{908}$) that provides the minimum (or close to minimum) value of $W_{910} + W_{912} + W_{914}$. The minimum value may be obtained by ordinary convergence methods. For example, various sets of values of ($W_{910}$, $W_{912}$, $W_{914}$) that satisfy the constraints identified above may be postulated, and the set of postulated values that produces the minimum value of $W_{910} + W_{912} + W_{914}$ is selected as the set of set points for the fixtures 910, 912 and 914.

In this manner, all of the lighting needs of all of the spaces 902, 904, 906 and 908 are met by the lowest values combination of set points ($W_{910}$, $W_{912}$, $W_{914}$) for the fixtures 910, 912 and 914, which conserves energy. Moreover, the lighting needs of the spaces are determined based on occupancy and the presence of natural light. The combinations of these considerations can lead to significant reduction in energy costs over the long run.

It will appreciated that the above described embodiments are exemplary, and that those of ordinary skill in the art may readily devise their own implementations and modifications that incorporate the principles of the invention and fall within the spirit and scope thereof.

I claim:

1. An arrangement comprising:
   a plurality of wireless microsystems, each microsystem operable to measure at least one parameter of a space, and to transmit the at least one parameter wirelessly, at least a first microsystem configured to measure the at least one parameter by obtaining a value by measuring a first aspect of light in the space and at least a second microsystem configured to measure the at least one parameter by measuring a second aspect of the light in the space;
   a controller operably coupled to receive information corresponding to the at least one parameter directly or indirectly, the controller operable to cause a change in a lighting control level based at least in part on the information; and
   wherein the first aspect comprises an intensity of light within a first defined wavelength band, and the second aspect comprises an intensity of light that includes light outside the first defined wavelength band.

2. The arrangement of claim 1, wherein the at least one parameter comprises an occupancy measurement for the space.

3. The arrangement of claim 1, wherein the first microsystem includes a MEMS sensor.

4. The arrangement of claim 1, further comprising at least one dimming ballast light fixture, and wherein the controller is operably connected to cause the change in the lighting control level by providing control signals to the at least one dimming ballast light fixture.

5. An arrangement comprising:
   a plurality of wireless microsystems, each microsystem operable to measure at least a light level measurement for a space, and to transmit light level information wirelessly; and
   a controller operably coupled to receive the light level information directly or indirectly, the controller operable to cause a change in a lighting control level based at least in part on the light level information and at least indirectly on occupancy information, the controller further operable to cause a change in a lighting control level based at least in part on a statistical light level value, the statistical light value generated based on light level information from each of the plurality of wireless microsystems, the statistical light value comprising a median or mean of the light level information from the plurality of wireless microsystems; and
   a processing circuit configured to generate a lighting set point based at least in part on the occupancy information, and wherein the controller is further operable to cause a change in lighting control by generating a control output based on the lighting set point and the light level information, wherein the processing circuit is operable to generate the lighting set point by selecting the lighting set point from at least three values, a lowest level value, a second level value, and a highest level value, and wherein selection of the lowest level value and the second value level require occupancy information indicative of a lack of occupancy.

6. The arrangement of claim 5, wherein selection of the second level value requires occupancy information indicative of a lack of occupancy for a first duration of time, and selection of the lowest level value requires occupancy information indicative of the lack of occupancy for a second duration of time that is longer than the first duration of time.

7. The arrangement of claim 5, wherein selection between the second level value and the lowest level value depends on time-of-day information.

8. The arrangement of claim 5, wherein the controller is operably coupled to receive at least a part of the occupancy information from a wireless measurement device, the wireless measurement device configured to detect a presence of occupants in the proximity of the space.

9. The arrangement of claim 8, further comprising at least one dimming ballast light fixture, and wherein the controller is operably connected to cause the change in the lighting control level by providing control signals to the at least one dimming ballast light fixture.

10. The arrangement of claim 5, wherein at least one of the plurality of microsystems includes a MEMS sensor.

11. The arrangement of claim 5, wherein the controller is operable to cause the change in the lighting control level further based on time of day information.

12. The arrangement of claim 5, wherein the controller includes the processing circuit.

13. An arrangement comprising:
   a plurality of wireless microsystems, each microsystem operable to measure at least a light level measurement for a space, and to transmit light level information wirelessly; and
   a controller operably coupled to receive the light level information directly or indirectly, the controller operable to cause a change in a lighting control level based at least in part on the light level information and at least indirectly on occupancy information, the controller further operable to cause a change in a lighting control level based at least in part on a statistical light level value, the statistical light value generated based on light level information from each of the plurality of wireless microsystems; and
   wherein
   said statistical light value comprises a median or mean of the light level information from the plurality of wireless microsystems;
   at least a first microsystem is configured to generate the light level information representative of a measurement of a first aspect of the light in the space;
   at least a second microsystem is configured to generate the light level information representative of a measurement of a second aspect of the light in the space;
   the controller is further operable to cause a change in a lighting control level based at least in part on the light level information from the first microsystem and the second microsystem; and
   the first aspect comprises an intensity of light within a first defined wavelength band, and the second aspect comprises an intensity of light that includes light outside the first defined wavelength band.

14. The arrangement of claim 13, wherein the first microsystem includes a MEMS sensor.

15. The arrangement of claim 13, further comprising at least one dimming ballast light fixture, and wherein the controller is operably connected to cause the change in the lighting control level by providing control signals to the at least one dimming ballast light fixture.

16. A method comprising:
   a) employing a plurality of wireless microsystems to measure at least one parameter of a space;
   b) employing at least a first wireless microsystem to measure the at least one parameter by measuring a first aspect of a light in the space;
   c) employing at least a second wireless microsystem to measure the at least one parameter by measuring a second aspect of the light in the space;
   d) transmitting the at least one parameter wirelessly;
   e) receiving the at least one parameter at a first device, the first device operably coupled to a controller; and
   f) employing the controller to cause a change in a lighting control level based at least in part on the at least one parameter of a space measured by the first and second wireless microsystems; and
   wherein the first aspect comprises an intensity of light exclusively within a first defined wavelength band, and the second aspect comprises an intensity of light that includes light outside the first defined wavelength band.

17. The method of claim 16, wherein step f) further comprises employing the controller to cause the change in the lighting control level based further on an occupancy measurement for the space.

18. The method of claim 16, wherein step f) further comprises:
   f1) generating a lighting set point based at least in part on occupancy information for the space; and
   f2) causing the change in the lighting level control by generating a control output based on the lighting set point and the at least one parameter.

19. The method of claim 18, wherein the occupancy information corresponds to a detected occupancy for the space.

20. A method comprising:
a) employing at least a first sensor to measure the at least one parameter by measuring a first aspect of a light in a space;
b) employing at least a second sensor to measure the at least one parameter by measuring a second aspect of the light in the space;
c) transmitting wirelessly information representative of the at least one parameter measured by the first sensor and by the second sensor;
d) receiving the information representative of the at least one parameter at a first device, the first device operably coupled to a controller; and
e) employing the controller to cause a change in a lighting control level based at least in part on the at least one parameter of a space measured by the first and second sensors; and
wherein the first aspect comprises an intensity of light exclusively within a first defined wavelength band, and the second aspect comprises an intensity of light that includes light outside the first defined wavelength band.

* * * * *